US010252828B2

(12) United States Patent
Sorbi et al.

(10) Patent No.: US 10,252,828 B2
(45) Date of Patent: Apr. 9, 2019

(54) PLANT FOR THE FILLING AND CAPPING OF CONTAINERS, IN PARTICULAR BOTTLES

(71) Applicant: Sidel S.p.A. CON SOCIO UNICO, Parma (IT)

(72) Inventors: Federica Sorbi, Parma (IT); Massimo Nascimbeni, Parma (IT)

(73) Assignee: SIDEL S.P.A. CON SOCIO UNICO, Parma (IT)

( * ) Notice: Subject to any disclaimer, the term of this patent is extended or adjusted under 35 U.S.C. 154(b) by 718 days.

(21) Appl. No.: 14/802,028

(22) Filed: Jul. 17, 2015

(65) Prior Publication Data
US 2016/0031577 A1 Feb. 4, 2016

(30) Foreign Application Priority Data

Jul. 31, 2014 (EP) .................................... 14179371

(51) Int. Cl.
| | |
|---|---|
| *B65B 43/52* | (2006.01) |
| *B65B 37/08* | (2006.01) |
| *B67B 3/00* | (2006.01) |
| *B65B 3/04* | (2006.01) |
| *B65B 43/46* | (2006.01) |

(Continued)

(52) U.S. Cl.
CPC ............... *B65B 43/52* (2013.01); *B65B 3/04* (2013.01); *B65B 37/08* (2013.01); *B65B 43/46* (2013.01); *B65G 29/00* (2013.01); *B67C 7/0053* (2013.01); *B65G 2201/0247* (2013.01)

(58) Field of Classification Search
CPC ...................... B65G 2201/0247; B65G 29/00; B65G 37/08; B65G 3/04; B65G 43/52; B67C 7/0053
USPC ........................................................ 53/282
See application file for complete search history.

(56) References Cited

U.S. PATENT DOCUMENTS

| | | | | |
|---|---|---|---|---|
| 4,109,446 | A † | 8/1978 | Krohn et al. | |
| 5,581,975 | A * | 12/1996 | Trebbi | B65G 47/847 |
| | | | | 53/282 |
| 9,233,800 | B2 † | 1/2016 | Senn | |

(Continued)

FOREIGN PATENT DOCUMENTS

| | | |
|---|---|---|
| DE | 9310749 | 10/1993 |
| DE | 102005042275 A1 † | 3/2007 |

(Continued)

OTHER PUBLICATIONS

Extended European Search Report dated Feb. 13, 2015 by the European Patent Office in counterpart European Patent Application No. 14179371.1.

*Primary Examiner* — Robert Long
*Assistant Examiner* — Xavier A Madison
(74) *Attorney, Agent, or Firm* — Finnegan, Henderson, Farabow Garrett & Dunner LLP

(57) ABSTRACT

A plant for filling and capping a container is disclosed. The plant comprises a transfer unit configured to feed the container along a feeding path. The transfer unit is connected to a filling drum via an outlet station, and connected to a capping drum via an inlet station. The transfer unit also has an outlet segment at the outlet station, which is straight and tangent to the filling drum, and an inlet segment at the inlet station, which is straight and tangent to the capping drum.

14 Claims, 3 Drawing Sheets

(51) Int. Cl.
*B67C 7/00* (2006.01)
*B65G 29/00* (2006.01)

(56) References Cited

U.S. PATENT DOCUMENTS

2011/0287127 A1\* 11/2011 Dupuis ................ B29C 49/421
　　　　　　　　　　　　　　　　　　　　　425/524
2014/0251766 A1† 9/2014 Fahldieck

FOREIGN PATENT DOCUMENTS

| DE | 102010018153 | | 10/2011 |
| EP | 1041034 | | 10/2000 |
| EP | 2301867 | A2 † | 3/2011 |
| WO | 2015101862 | A1 † | 7/2015 |

\* cited by examiner
† cited by third party

PLANT FOR THE FILLING AND CAPPING OF CONTAINERS, IN PARTICULAR BOTTLES

CROSS-REFERENCE TO RELATED APPLICATIONS

This application claims the benefit of priority of European Patent Application No. 14179371.1, filed Jul. 31, 2014, which is incorporated herein by reference.

The present invention relates to a plant for bottling containers, in particular bottles.

In the bottling technical field, it is known to provide a plant comprising a blowing unit to blow the containers starting from relative preforms; a filling unit to feed a product into the containers; a capping unit to close the containers with respective caps; and a labelling unit to label the containers.

The filling unit comprises a filling drum, which is mounted so as to rotate around a first rotation axis, is provided with a plurality of clamp members, which are each suited to receive and hold a relative container, and has, for each clamp member, a respective dosing device, which is configured to feed a product into the relative container.

The capping unit comprises a capping drum, which is mounted so as to rotate around a second rotation axis, is provided with a plurality of clamp members, which are each suited to receive and hold a relative container, and has, for each clamp member, a respective capping device, which is configured to close the relative container with a cap.

Generally, the plant comprises, furthermore, a transfer unit to transfer the containers from the filling unit to the capping unit.

The transfer unit comprises at least one feeding wheel, which is mounted so as to rotate around a third rotation axis, and is provided with a plurality of clamp members, which are each suited to receive and hold a relative container.

The feeding wheel is connected to the filling unit in correspondence to an outlet station to let the containers out of the filling drum, and to the capping unit in correspondence to an inlet station to let the containers into the capping drum.

With regard to what described above, it should be pointed out that, due to the centrifugal force exerted upon each container by the rotation of the filling drum, of the feeding wheel, and of the capping drum, the free surface of the product inside each container is inclined relative to a horizontal reference plane, which is perpendicular to the rotation axes of the above-mentioned filling drum and capping drum.

Since the feeding wheel has a direction of rotation that is opposite to the directions of rotation of the filling drum and of the capping drum, known bottling plants of the type described above feature some drawbacks that are mainly due to the fact that, during the transfer of the containers from the filling drum to the feeding wheel and from the feeding wheel to the capping drum, the centrifugal force acting upon the containers instantaneously changes its direction, thus causing an instantaneous inversion of the inclination of the free surface of the product inside the containers and, therefore, possibly, a partial spill of product from the container themselves, depending on the bottle shape, drum diameter, speed of rotation, etc.

It is an object of the present invention to provide a plant for bottling containers, in particular bottles, which is designed to eliminate the aforementioned drawbacks in a straightforward, relatively low-cost manner.

According to the present invention, a plant for bottling containers, in particular bottles, is provided according to the appended claims.

The present invention will now be described with reference to the accompanying drawings, which show a non-limiting embodiment thereof, wherein.

Figure 1:
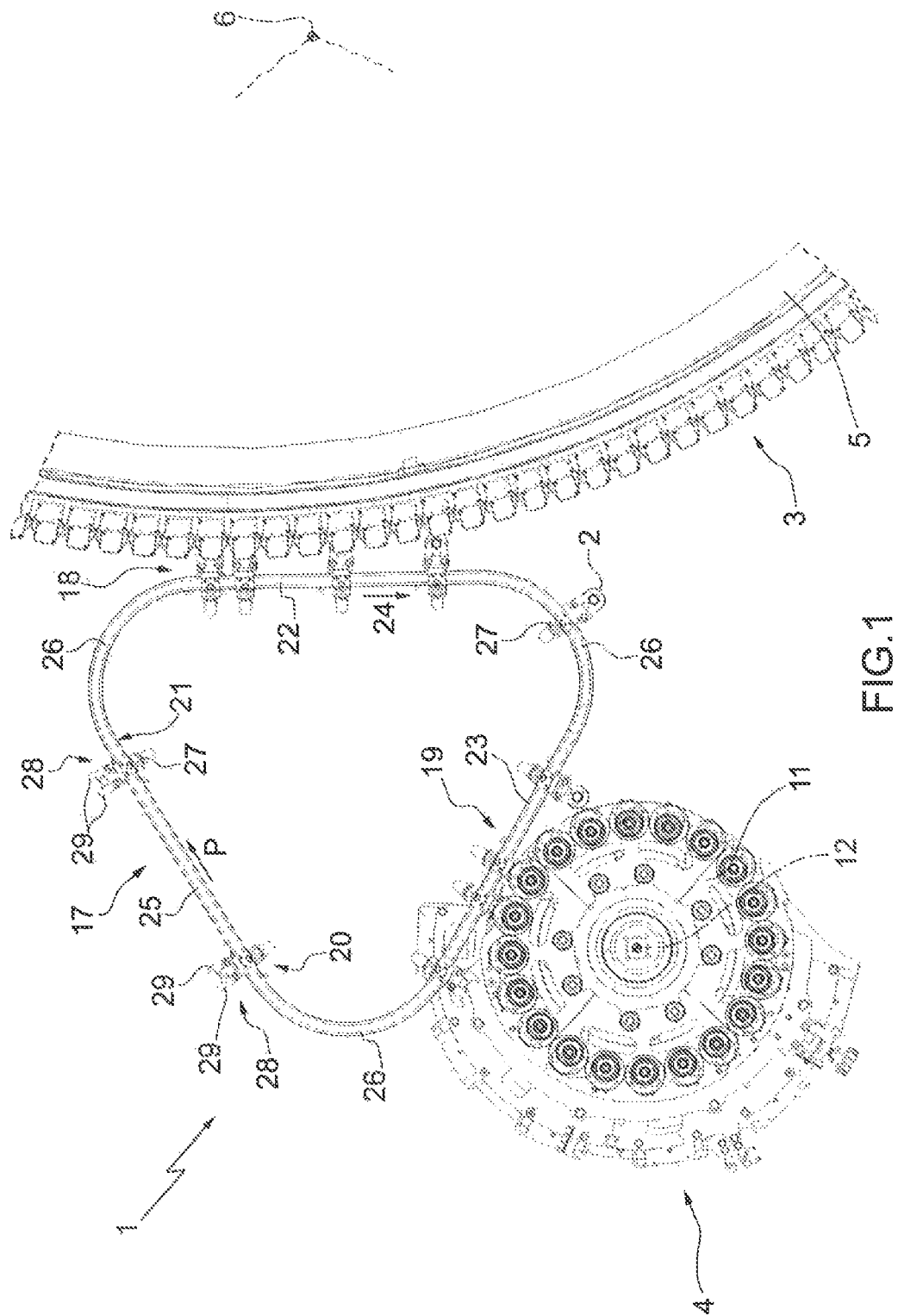
FIG. 1 shows a schematic plan view, with parts removed for greater clarity, of a preferred embodiment of the bottling plant according to the present invention.
Figure 2:
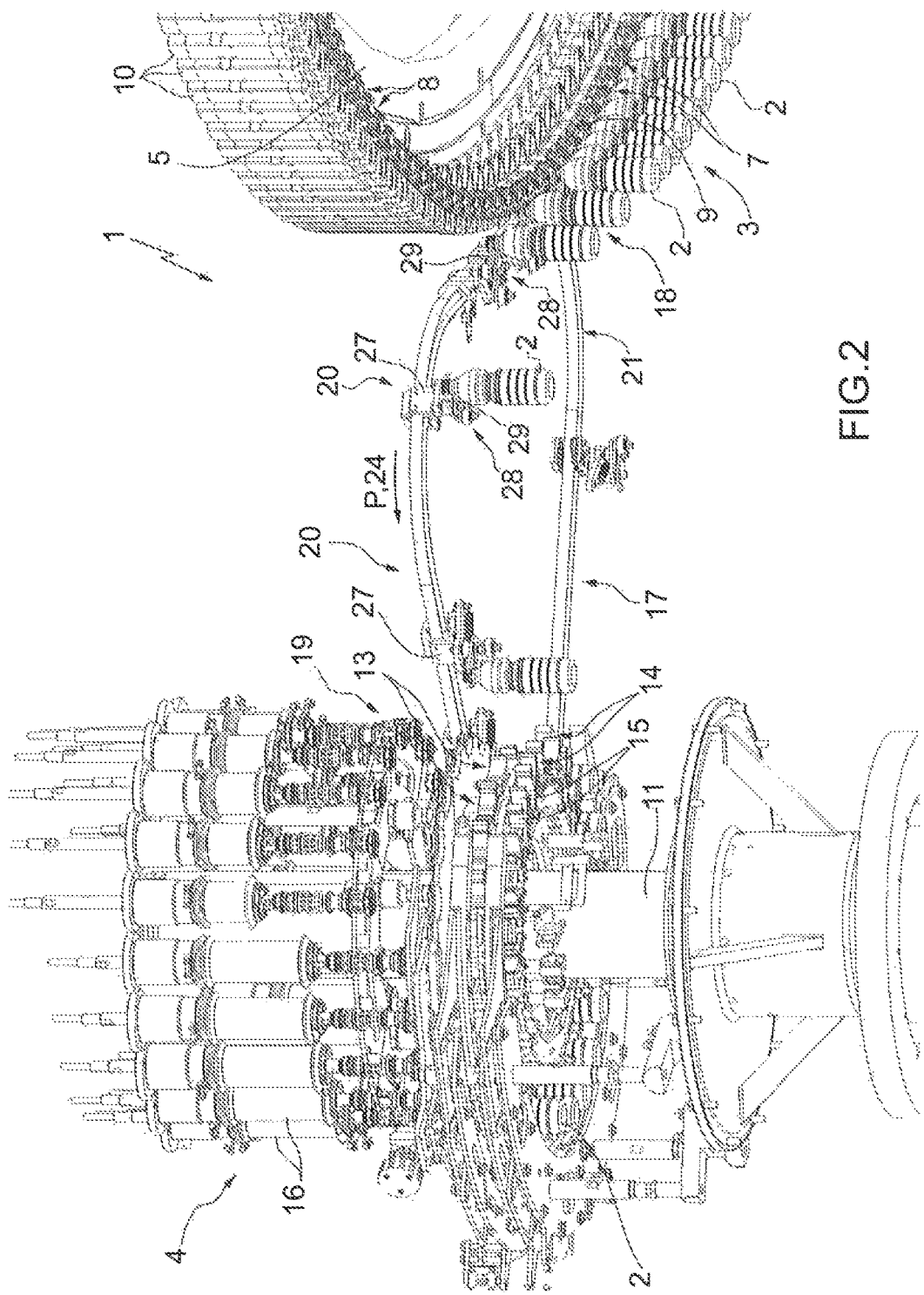
FIG. 2 shows a first schematic perspective view, with parts removed for greater clarity, of the bottling plant of FIG. 1.
Figure 3:
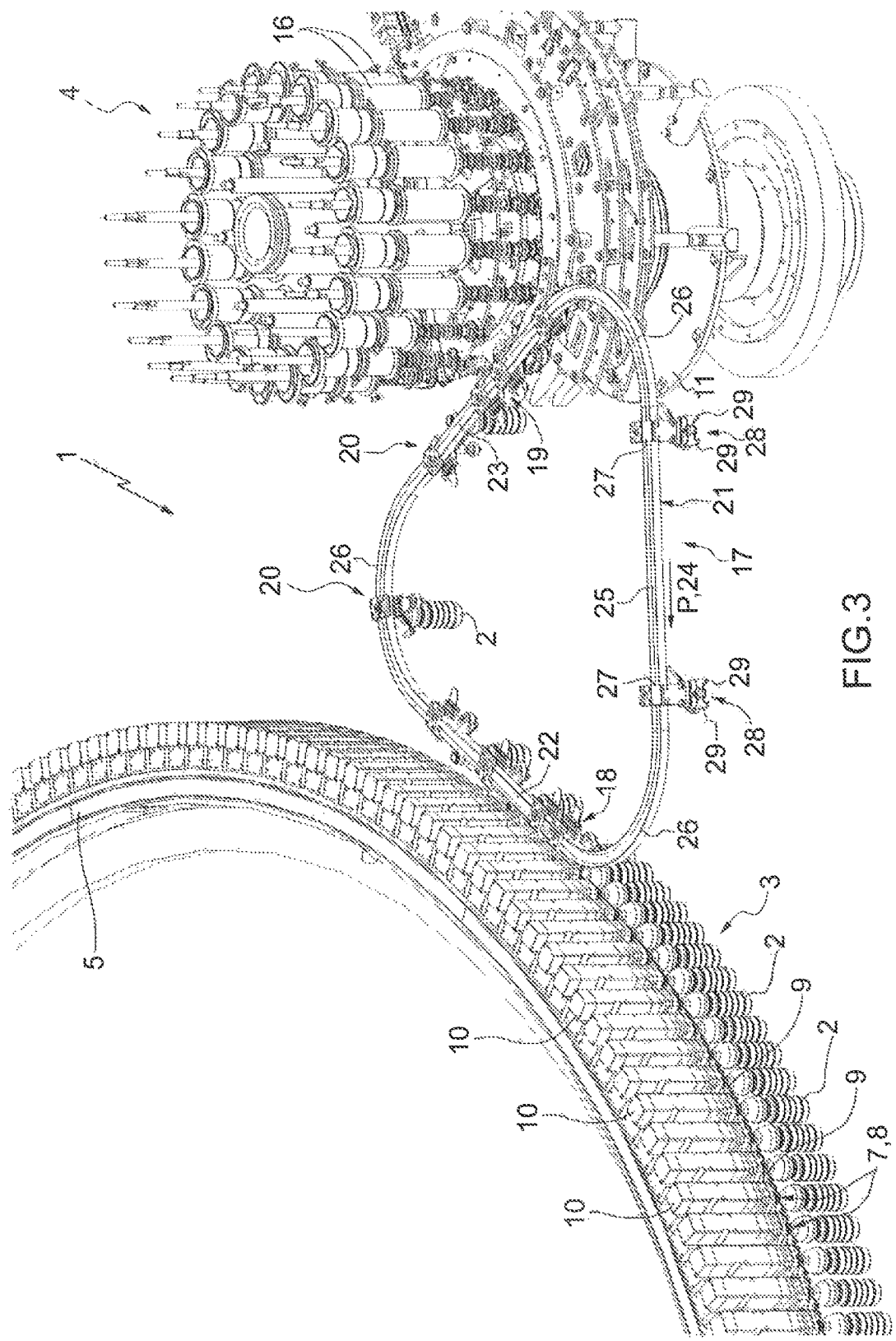
FIG. 3 shows a second schematic perspective view, with parts removed for greater clarity, of the bottling plant of FIG. 1.

With reference to FIGS. 1, 2 and 3, number 1 indicates, as a whole, a plant for bottling containers, namely PET bottles 2.

The plant 1 comprises, in sequence and in this order, a blowing unit of the known type, which is not shown, to blow the bottles 2 starting from relative preforms (not shown); a filling unit 3 of the known type to feed a product, normally a product in the liquid state (or a mixture of liquid and gas or a mixture of liquid and solid particles), into the bottles 2; a capping unit 4 of the known type to close each bottle 2 with a relative cap (not shown); and a labelling unit of the known type, which is not shown, to label the bottles 2.

The filling unit 3 comprises a filling drum 5, which is mounted so as to continuously rotate around a rotation axis 6 that is substantially vertical and perpendicular to the plane of the sheet of FIG. 1.

The drum 5 is provided with a plurality of pick and place devices 7, which are mounted along a peripheral edge of the drum 5, and are uniformly distributed around the axis 6.

Each device 7 is configured so as to hold the relative bottle 2 in correspondence to its upper neck, and comprises a clamp member 8 provided with two jaws 9, which are mobile between a clamping position and a release position to respectively clamp and release the relative bottle 2.

Each device 7 cooperates with a dosing device 10, which is mounted above the device 7 to feed a given quantity of product into the relative bottle 2.

The capping unit 4 comprises a capping drum 11, which is mounted so as to continuously rotate around a rotation axis 12 that is substantially vertical and parallel to the axis 6.

The drum 11 is provided with a plurality of pick and place devices 13, which are mounted along a peripheral edge of the drum 11, and are uniformly distributed around the axis 12.

Each device 13 is configured so as to hold the relative bottle 2 in correspondence to its lower body, and comprises a clamp member 14 provided with two jaws 15, which are mobile between a clamping position and a release position to respectively clamp and release the relative bottle 2.

Each device 13 cooperates with a capping device 16, which is mounted above the device 13 so as to close the relative bottle 2 with a cap (not shown).

The plant 1 comprises, furthermore, a transfer unit 17 to transfer the bottles 2 from the filling unit 3 to the capping unit 4.

The unit 17 is connected to the unit 3 in correspondence to an outlet station 16 to let bottles 2 out of the drum 5, and to the unit 4 in correspondence to an inlet station 19 to let bottles 2 into the drum 11.

The unit 17 comprises a plurality of pick and place devices 20, which are mobile along a feeding path P, which is closed in a ring-like manner and is defined by a track 21, preferably a fixed-coil track or linear motor, namely a synchronous linear motor.

The path P, in particular, has a substantially triangular shape and comprises, in correspondence to the station 18, an outlet segment 22, which is straight and tangent to the drum 5, and, in correspondence to the station 19, an inlet segment 23, which is straight and tangent to the drum 11.

The segment 22 extends at least downstream of the station 18 in a feeding direction 24 of the devices 20 along the track 21; and the segment 23 extends at least upstream of the station 19 in the direction 24 itself.

The path P comprises, furthermore, a straight connection segment 25 and three curved joining segments 26 to connect the segments 22, 23 and 25 to one another.

Each device 20 is configured to hold the relative bottle 2 in correspondence to its upper neck, and comprises a magnetic mover 27, which is coupled to the track 21 in a sliding manner.

The magnetic mover 27 supports a clamp member 28 provided with two jaws 23, which are mobile between a clamping position and a release position to respectively clamp and release the relative bottle 2.

The devices 20 are mobile along the track 21 with respective laws of motion that are independent of one another and, therefore, are able to adjust the speed and distribution pitch of the bottles 2 in correspondence to the station 18, namely on the drum 5, to the speed and distribution pitch of the bottles 2 in correspondence to the station 19, namely on the drum 11.

In use, each pick and place device 20 is fed through the station 18 in phase with a device 7 so as to remove the relative bottle 2 from the device 7 and is fed through the station 19 in phase with a device 13 so as to release the relative bottle 2 to the device 13.

Since the bottles 2 get out of the drum 5 along the segment 22, namely a straight segment of the path P, and get into the drum 11 along the segment 23, namely a straight segment of the path P, the centrifugal force acting upon the bottles 2 along the segments 22 and 23 is substantially cancelled, so as to stabilize the free surface of the product contained in the bottles 2.

The invention claimed is:

1. A plant for filling and capping a container, the plant comprising:
    a filling drum configured to rotate around a first rotation axis and to feed a product into the container;
    a capping drum configured to rotate around a second rotation axis and to close the container with a cap; and
    a transfer unit configured to transfer the container from the filling drum to the capping drum, wherein the transfer unit is connected to the filling drum via an outlet station, and connected to the capping drum via an inlet station, and wherein the transfer unit includes:
        an outlet segment at the outlet station that is substantially straight and tangent to the filling drum, the outlet segment extending along a first axis;
        an inlet segment at the inlet station that is substantially straight and tangent to the capping drum, the inlet segment extending along a second axis that forms an oblique angle with the first axis, wherein the inlet segment and the outlet segment form at least a portion of a feeding path; and
        a plurality of pick and place devices moveable along the feeding path and configured to hold the container by an upper neck of the container during movement of the container along the feeding path,
    wherein the feeding path is substantially triangular.

2. A plant for filling and capping a container, the plant comprising:
    a filling drum configured to rotate around a first rotation axis and to feed a product into the container;
    a capping drum configured to rotate around a second rotation axis and to close the container with a cap; and
    a transfer unit configured to transfer the container from the filling drum to the capping drum, wherein the transfer unit is connected to the filling drum via an outlet station, and connected to the capping drum via an inlet station, and wherein the transfer unit includes:
        an outlet segment at the outlet station that is substantially straight and tangent to the filling drum, the outlet segment extending along a first axis;
        an inlet segment at the inlet station that is substantially straight and tangent to the capping drum, the inlet segment extending along a second axis that forms an oblique angle with the first axis, wherein the inlet segment and the outlet segment form at least a portion of a feeding path; and
        a plurality of pick and place devices moveable along the feeding path and configured to hold the container by an upper neck of the container during movement of the container along the feeding path,
    wherein the transfer unit further includes a connection segment that is substantially straight and that connects to each of the inlet and outlet segments.

3. The plant according to claim 2, wherein the transfer unit further includes:
    a first curved-joining segment connecting the outlet segment and the inlet segment;
    a second curved-joining segment connecting the inlet segment and the connection segment; and
    a third curved-joining segment connecting the connection segment and the outlet segment,
    wherein the inlet segment, the outlet segment, the connection segment, and the first, second, and third curved-joining segments form a substantially triangular feeding path.

4. The plant according to claim 2, wherein the pick and place devices are mobile along the feeding path such that a speed and a distribution pitch of the container is adjusted independently between the outlet and inlet stations.

5. The plant according to claim 2, wherein the feeding path is closed in a ring-like manner and extends through the outlet and inlet stations.

6. The plant according to claim 2, wherein the outlet segment extends downstream of the outlet station in a feeding direction of the pick and place devices along the feeding path, and the inlet segment extends upstream of the inlet station in the feeding direction.

7. The plant according to claim 2, wherein each pick and place device comprises a clamp member and a linear motor to move the clamp member along the feeding path.

8. The plant according to claim 2, wherein each pick and place device comprises a clamp member, which is mobile between a clamping position and a release position to clamp and release the container.

9. The plant according to claim 2, wherein the filling drum is provided with a plurality of clamp members, each clamp member being mounted so as to be mobile between a clamping position and a release position to clamp and release the container, and being fed by the filling drum around the first rotation axis.

10. The plant according to claim 2, wherein the capping drum is provided with a plurality of clamp members, each clamp member being mounted so as to be mobile between a clamping position and a release position to clamp and release the container, and being fed by the capping drum around the second rotation axis.

11. The plant according to claim 2, wherein the inlet segment is separate from the outlet segment.

12. The plant according to claim 2, wherein the oblique angle is an acute angle.

13. A plant for filling and capping a container, the plant comprising:
   a filling drum configured to rotate around a first rotation axis and to feed a product into the container;
   a capping drum configured to rotate around a second rotation axis and to close the container with a cap; and
   a transfer unit configured to transfer the container from the filling drum to the capping drum, wherein the transfer unit is connected to the filling drum via an outlet station, and connected to the capping drum via an inlet station, and wherein the transfer unit includes:
      an outlet segment at the outlet station that is substantially straight and tangent to the filling drum, the outlet segment extending along a first axis;
      an inlet segment at the inlet station that is substantially straight and tangent to the capping drum, the inlet segment extending along a second axis that forms an oblique angle with the first axis, wherein the inlet segment and the outlet segment form at least a portion of a feeding path; and
      a plurality of pick and place devices moveable along the feeding path and configured to hold the container by an upper neck of the container during movement of the container along the feeding path,
   wherein the outlet segment extends downstream of the outlet station in a feeding direction of the pick and place devices along the feeding path, and the inlet segment extends upstream of the inlet station in the feeding direction, and
   wherein the outlet segment extends downstream of the outlet station in the feeding direction for a length of at least two container widths, and the inlet segment extends upstream of the inlet station in the feeding direction for a length of at least two container widths.

14. A plant for filling and capping a container, the plant comprising:
   a filling drum configured to rotate around a first rotation axis and to feed a product into the container;
   a capping drum configured to rotate around a second rotation axis and to close the container with a cap; and
   a transfer unit configured to transfer the container from the filling drum to the capping drum, wherein the transfer unit is connected to the filling drum via an outlet station, and connected to the capping drum via an inlet station, and wherein the transfer unit includes:
      an outlet segment at the outlet station that is substantially straight and tangent to the filling drum, the outlet segment extending along a first axis;
      an inlet segment at the inlet station that is substantially straight and tangent to the capping drum, the inlet segment extending along a second axis that forms an oblique angle with the first axis, wherein the inlet segment and the outlet segment form at least a portion of a feeding path; and
      a plurality of pick and place devices moveable along the feeding path and configured to hold the container by an upper neck of the container during movement of the container along the feeding path,
   wherein the outlet segment extends downstream of the outlet station in a feeding direction of the pick and place devices along the feeding path, and the inlet segment extends upstream of the inlet station in the feeding direction, and
   wherein:
      when the container is transferred from the rotating filling drum to the outlet segment at the outlet station, a first centrifugal force causes a free surface of the product inside the container to be inclined,
      the outlet segment extends downstream of the outlet station in the feeding direction for at least a time period that it takes for the free surface of the product in the container to become substantially horizontal during movement along the outlet segment,
      when the container moves along the feeding path from the outlet segment to the inlet segment, a second centrifugal force causes the free surface of the product to be inclined, and
      the inlet segment extends upstream of the inlet station in the feeding direction for at least a time period that it takes for a free surface of the product in the container to become substantially horizontal during movement along the inlet segment.

* * * * *